United States Patent [19]

Sapp

[11] Patent Number: 5,333,715
[45] Date of Patent: Aug. 2, 1994

[54] SORTING CONVEYOR SYSTEM AND DIVERT SWITCH AND CROSSOVER SWITCH FOR SAID SYSTEM

[75] Inventor: Gordon K. Sapp, Danville, Ky.

[73] Assignee: FKI Industries, Inc., Fairchild, Conn.

[21] Appl. No.: 980,195

[22] Filed: Nov. 20, 1992

Related U.S. Application Data

[63] Continuation-in-part of Ser. No. 807,493, Dec. 16, 1991, Pat. No. 5,217,105.

[51] Int. Cl.$^5$ .............................................. B65G 37/00
[52] U.S. Cl. ..................................... 198/372; 198/440
[58] Field of Search ................ 198/372, 365, 370, 440

[56] References Cited

U.S. PATENT DOCUMENTS

| | | | |
|---|---|---|---|
| 3,986,596 | 10/1976 | Hamilton | 198/365 |
| 3,987,888 | 10/1976 | Wickam | 198/365 X |
| 4,416,450 | 11/1983 | van Wijngaarden | 198/367 X |
| 4,637,508 | 1/1987 | Kikuchi et al. | 198/365 |
| 4,760,908 | 8/1988 | Houghton | 198/365 |
| 4,971,190 | 11/1990 | Berends et al. | 198/372 X |
| 5,027,939 | 7/1991 | Kilper et al. | 198/372 X |
| 5,038,912 | 8/1991 | Cotter | 198/372 X |

OTHER PUBLICATIONS

Tecklenburg, Sharon, "Brushless Torque Actuators Replace Rotary Solenoids", *Machine Design*, Jan. 23, 1992, pp. 46-51.

Primary Examiner—Cheryl L. Gastineau
Attorney, Agent, or Firm—Gilliam & Stockwell

[57] ABSTRACT

A slat sorter comprises a main line conveyor with a transport surface on which pusher elements are mounted. The main conveyor is driven by a bearing chain that cooperates with a sprocket that is in turn driven by an electric motor. The pusher elements are selectively diverted by a divert switch from forward travel in a straight-through mode to diagonal travel across the transport surface in a divert mode to engage and direct articles to a takeaway conveyor. The divert switch comprises a switch arm that is positively actuated to both a home position for straight-through mode and a divert position for divert mode by a brushless torque actuator that generates rotary driving operation, but without linear-to-rotary motion conversion. A crossover switch is provided to guide the pusher elements in the proper diagonal path. A gate is driven to pivot between limit positions by a brushless torque actuator to facilitate unobstructed pusher element travel along the desired diagonal path.

15 Claims, 6 Drawing Sheets

PRIOR ART

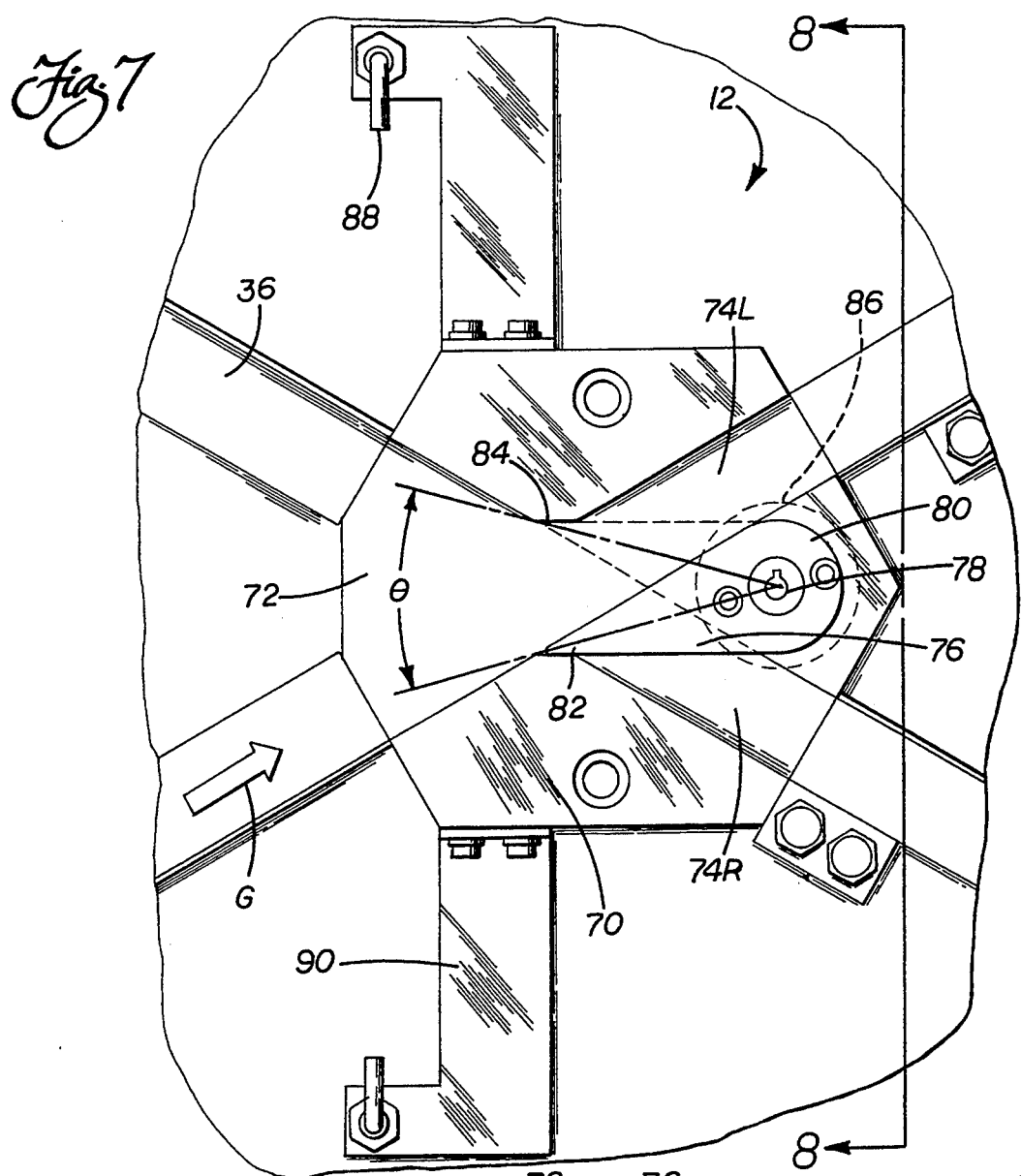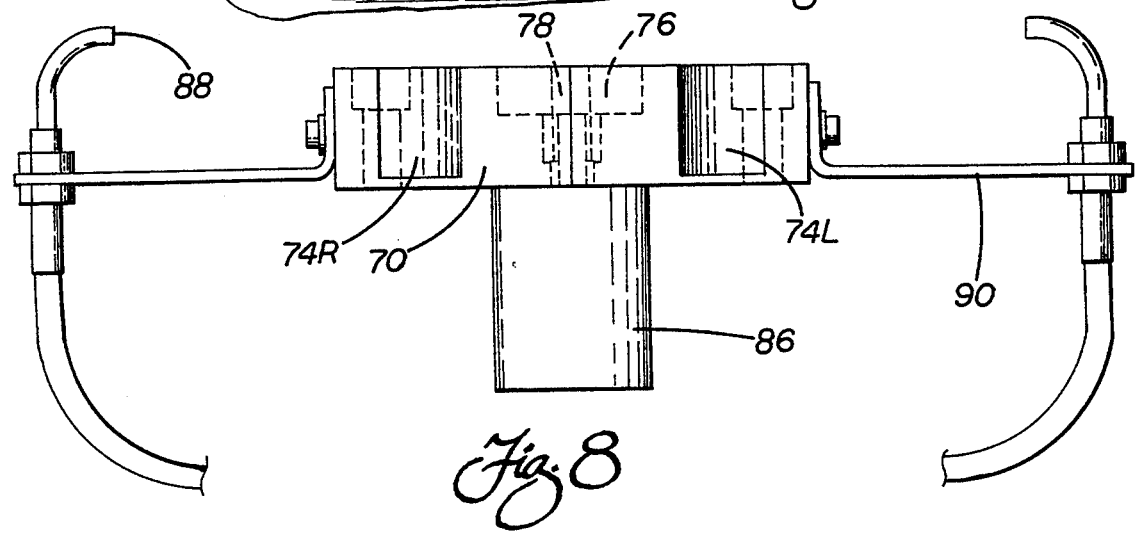

SORTING CONVEYOR SYSTEM AND DIVERT SWITCH AND CROSSOVER SWITCH FOR SAID SYSTEM

This is a continuation-in-part of application Ser. No. 07/807,493, filed Dec. 16, 1991, now U.S. Pat. No. 5,217,105.

TECHNICAL FIELD

The present invention relates generally to sorting conveyor systems and, more particularly, to a slat sorter and a high speed divert switch and a crossover switch for the slat sorter.

BACKGROUND OF THE INVENTION

Sorting conveyor systems are commonly found in manufacturing and storage facilities. These conveyor systems function to transport and direct articles to specific locations for later processing and/or handling. They are particularly useful, for example, in loading dock areas of manufacturing plants for directing boxed products to the desired processing or loading site.

One type of sorting conveyor system used for this purpose is commonly known as a slat sorter. This design includes a plurality of transverse tubes or slats that form the transport surface. A plurality of pusher elements or divert shoes are supported by the transport surface and are guided to travel along either of opposing sides of the surface during normal forward operation. When it is necessary to direct an article from the main conveyor run to an adjacent takeaway conveyor, a switch mechanism causes an assigned set of divert shoes to be diverted to slide across the conveyor surface in a diagonal direction. The divert shoes thus engage and direct the article to the takeaway conveyor.

In order the increase the operating efficiency of this type of conveyor, it is necessary to increase the speed with which slat sorters operate. The forward velocity of the slat sorter is limited by, among other things, the speed of the switch mechanism in selectively diverting the divert shoes. Most prior art switch actuators are pneumatically operated. When the switch actuator is activated, the switch is driven from a home position to a divert position. Upon deactivation of the switch actuator, the switch is returned to the home position by return pneumatic action or the biasing action of a return spring. The operating speed of such a switch design is limited by the physical nature of the components.

It is apparent that the lead time for signaling the activation of the switch actuator is a critical factor in proper operation. Some prior art slat sorter designs have experienced difficulty in coordinating the timing of the signal to actuate and control the switch mechanism. In fact, at faster operating speeds it may even become necessary to adjust the upstream position of the sensor that signals actuation in order to provide the proper timing. It can be appreciated that such designs require constant adjustment and, hence, are inconvenient to utilize. Further, such adjustment reduces the overall operational efficiency of these conveyor systems.

The operational speed of slat sorters is also affected by the means used to drive the transport surface. Most slat sorters with sprocket/chain assemblies use bushed chains that have moderate frictional resistance. This tends to put additional load on the prime mover. This in turn tends to inhibit conveyor speed. Other designs use a bushed chain with outboard precision bearings which adds to the complexity of the machine.

Many slat sorters are also designed with the capability of diverting packages to takeaway conveyors positioned on either side of the main conveyor. These sorters have the ability to support and guide divert shoes on either side of the transport surface and divert the shoes to shift diagonally across the surface in either direction. To achieve this end these slat sorters are provided with a divert shoe guiding network with tracks that have a crossing configuration. These designs necessarily incorporate a crossover switch at the intersection of the crossing tracks. Most prior art designs again incorporate pneumatic switches that significantly increase the complexity and thus cost of the slat sorter.

Accordingly, there is a need to overcome the drawbacks and disadvantages of the prior art designs described above. An improved divert switch is desired that will allow more efficient and dependable higher speed operation. An improved crossover switch is also needed. Both switches used in the slat sorter should be easy and economical to manufacture and offer enhanced durability for a longer service life.

SUMMARY OF THE INVENTION

It is therefore a primary object of the present invention to overcome the above-described limitations and disadvantages of prior art slat sorters.

An additional object of the present invention is to provide a slat sorter that is capable of operation at higher speeds than possible with previously known designs.

Still another object of the present invention is to provide a slat sorter having switching components such as a divert switch and a crossover switch that are selectively actuated and positively moved between their limit positions in both motive directions.

A further object of the present invention is to provide switching components such as a divert switch and/or a crossover switch for a slat sorter that are driven by an actuator that drives though rotary motion without requiring linear-to-rotary motion conversion.

Another object of the present invention is to provide switching components such as a divert switch and/or a crossover switch for a slat sorter that are driven by an actuator that generates torque over a limited angle of rotation.

It is an additional object of the present invention to provide in a slat sorter a divert switch and/or crossover switch that minimizes space requirements by eliminating the need to accommodate for clearance resulting from external movement of the switch actuator.

Yet another object of the present invention is to provide a slat sorter that includes switching components that operate with dependable efficiency and have a long service life.

It is yet another object of the present invention to provide a slat sorter with switching components such as a divert switch and a crossover switch having optical sensors that do not require position adjustment at high operating speeds.

It is still another object of the present invention to provide a slat sorter with divert and crossover switches of simplified and cost-efficient design.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, novel divert and crossover switches for use with a slat sorter are provided. The improved design of the divert switch is particularly valuable in increasing the operational speed of the slat sorter. The divert switch and the crossover switch are both comprised of few components and thus are of simplified design. This aids in reducing the overall cost of manufacturing the respective switches and, hence, a slat sorter incorporating them while improving operating efficiency of the sorter.

The slat sorter of the present invention includes a main line conveyor that transports articles in a forward direction and provides selective diversion of the articles as desired to takeaway conveyors that are positioned at strategic points along the sides of the main conveyor. The main conveyor includes a frame that supports a transport surface. The transport surface is preferably comprised of a plurality of transverse tubes or slats that extend between the sides of the frame. The transport surface supports a plurality of pusher elements or divert shoes that are mounted to allow for lateral shifting across the transport surface. More specifically, the divert shoes generally travel with the main line conveyor along either of opposing sides of the transport surface when the slat sorter is operating in a straight-through mode, i.e. the article is moving forwardly for later downstream handling. Alternatively, as will be described in more detail below, the divert shoes may be selectively diverted to slide across the transport surface in a diagonal path in the divert mode to engage and direct articles to a takeaway conveyor.

Guide tracks are mounted to the conveyor frame beneath the transport surface to engage a guide member depending from each divert shoe so as to guide the shoes in either the forward direction when in straight-through mode or, alternatively, diagonally across the transport surface when in the divert mode.

In order to initiate the divert mode, a divert switch is provided at selected positions along the conveyor. The divert switch intercepts the divert shoes when actuated and directs them toward the predetermined diagonal path necessary to direct an article to the selected takeaway conveyor. The divert switch comprises a base that is attached to the main line conveyor. A switch arm is mounted to the base so as to be movable between a home position defining the straight-through mode and a divert position defining the divert mode.

In an important aspect of the invention, the divert switch includes means defined by rotary driving operation, but operative without linear-to-rotary motion conversion, for selectively actuating the movement of the switch arm to both the home and divert positions. This is in contrast to a rotary solenoid wherein a solenoid armature is driven in a linear direction when power is applied. The linear motion of the armature is then converted to rotary motion to drive the load through a predetermined rotational angle. By eliminating the linear-to-rotary motion conversion, the inventive divert switch allows for faster and more efficient sorter operation and minimizes space requirements.

In the preferred embodiment of the divert switch, a rotary actuator which is energizable through a single phase coil is utilized to generate torque over a limited angle of rotation. Since a single phase coil is employed, there are no internal switching components such as brush/commutator assemblies in the actuator. Switching components are needed in different types of rotary movers such as torque motors to serially adjust the application of electrical current to multiple phase coil assemblies in order to generate continuous full rotation in contrast to limited angle rotation. The particular preferred divert switch employs a brushless torque actuator for this function.

The brushless torque actuator of the present invention is preferably adapted to be energizable to pulse for rotation in both the clockwise and counterclockwise directions. This allows for positive and controlled driving of the switch arm to both operable positions. More specifically, when the brushless torque actuator of a right-hand divert switch is energized to pulse in the counterclockwise direction, the switch arm is positively pivoted from the home position to the divert position. Subsequently, when the torque actuator is energized to pulse in the clockwise direction, the switch arm is positively pivoted from the divert position back to the home position.

It can be appreciated that rotary motion actuators represent a significant improvement over prior art pneumatic actuators that drive the switch arm through a linkage assembly, which physically limits the switching time to a great degree. By positively actuating the movement of the switch arm in both directions with pure rotary motion, the inventive divert switch significantly shortens the switching time and eliminates the wear problems and space considerations associated with mechanical linkage components.

To further optimize the operation of the inventive divert switch, the switch arm is provided with an arcuate contour or curvature. Thus, as the guide member of the divert shoe engages the switch arm in the divert position, the divert shoe smoothly transitions from forward movement to diagonal movement. Furthermore, the shock loading on the divert shoe is reduced, leading to longer service life.

Preferably, the curvature of the switch arm is such that when in the divert position, a tangent drawn at the critical point adjacent the exit of engagement between the switch arm and the divert shoe guide member defines an oblique angle that is greater relative to the axis of forward travel than the divert angle. This allows the divert shoes to pass through the switch area and reach the diagonal guide track as quickly as possible, optimizing the time/space relationship of the switch configuration. The divert switch cooperates with a sensor that is attached to the conveyor frame upstream from the switch arm. The sensor counts the pusher elements as they pass by and signals a programmable controller which in turn orders the brushless torque actuator to pivot the switch arm to the divert position at the appropriate time according to operational requirements. Advantageously, the design of the novel divert switch in combination with the programmable controller allows the sensor to be mounted in a fixed upstream position without the need for adjustment of the sensor even when the conveyor is operated at higher speeds.

In order to efficiently handle the diversion of articles off either side of the main conveyor, the slat sorter is provided with a crossing track network at various strategic positions relative to the takeaway conveyors. This crossing track network is adapted to guide the divert shoes in either direction across the transport surface depending on diversion requirements. At the point of crossing, the network is provided with a crossover switch that ensures free, unimpeded travel for the divert shoes in the correct diagonal direction.

The inventive crossover switch is also designed to operate through rotary actuation. The switch includes a base that is attached to the main line conveyor and includes an entry opening at its leading end to substantially ensure that divert shoe guide members approaching the base slightly off line do not engage a wall that stops its forward movement and creates a catastrophic jam. The entry opening narrows to a point where the path of the diagonal guide tracks cross. Diverging channels extend from the crossing point through the trailing end of the base. The channels align with the downstream sections of the diagonal guide tracks.

A gate is mounted to the trailing end of the base of the crossover switch and is movable between two limit positions. In each limit position, the gate blocks the channel in the base aligned with the temporarily inactive diagonal guide track. In this configuration, the gate creates a bridge across the inactive channel to form a substantially continuous wall against which the guide member travels to allow unimpeded travel through the crossover switch on its desired diagonal path.

The gate preferably takes the form of a flipper. The gate has a proximal end that defines a pivot axis about which the gate rotates to its limit positions. The gate tapers to an apex at its distal end. At each of its limit positions, the apex of the gate rests against a seat formed in the base. The seats are in opposing relation at the point of intersection of the travel paths of the diagonal guide tracks. The seats cooperate with the tapered gate to allow the formation of the substantially continuous wall to facilitate smooth travel for the divert shoe guide members therethrough.

Advantageously and similarly to the divert switch described above, the inventive crossover switch includes means defined by rotary driving operation, but operative without linear-to-rotary motion conversion, for selectively actuating the movement of the gate between the limit positions. The inventive crossover switch also preferably uses a rotary actuator that generates torque over a limited angle of rotation in response to energization through a single-phase coil. As with the divert switch, the particular preferred embodiment of the crossover switch utilizes a brushless torque actuator. Thus, all of the advantages described above regarding the actuator of the divert switch apply as well with the actuator of the crossover switch.

The crossover switch also preferably includes a sensor that is mounted to the main line conveyor at an upstream position from the crossover location. The sensor cooperates with the controller to regulate the actuation of the gate between the limit positions.

An additional improvement provided by the slat sorter is the incorporation of a precision bearing chain to assist the driving operation of the transport surface. The precision bearing chain enhances the efficiency and speed of the slat sorter as compared with prior art designs.

Still other objects of the present invention will become apparent to those skilled in this art from the following description wherein there is shown and described a preferred embodiment of this invention, simply by way of illustration of one of the modes best suited to carry out the invention. As will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawing, incorporated in and forming a part of the specification, illustrates several aspects of the present invention and together with the description serves to explain the principles of the invention. In the drawing:

FIG. 7 is an enlarged plan view of the crossover switch of the present invention showing the gate at its two limit positions, one in full line illustration and one in phantom line illustration;

FIG. 8 is a side view of the crossover switch of the present invention taken along lines 8-8 of FIG. 7, with the brushless torque actuator shown in position below the base.

Reference will now be made in detail to the present preferred embodiment of the invention, an example of which is illustrated in the accompanying drawing.

DETAILED DESCRIPTION OF THE INVENTION

A divert switch 10 and a crossover switch 12 constructed in accordance with the teachings of the present invention are disclosed as cooperating with a slat sorter 14. It will be appreciated from the discussion below in conjunction with the drawings of the preferred embodiment, that the incorporation of the divert switch 10 and crossover switch 12 with the other components allows the slat sorter 14 to operate at higher speeds and increases its efficiency with a simplified design.

Figure 1:
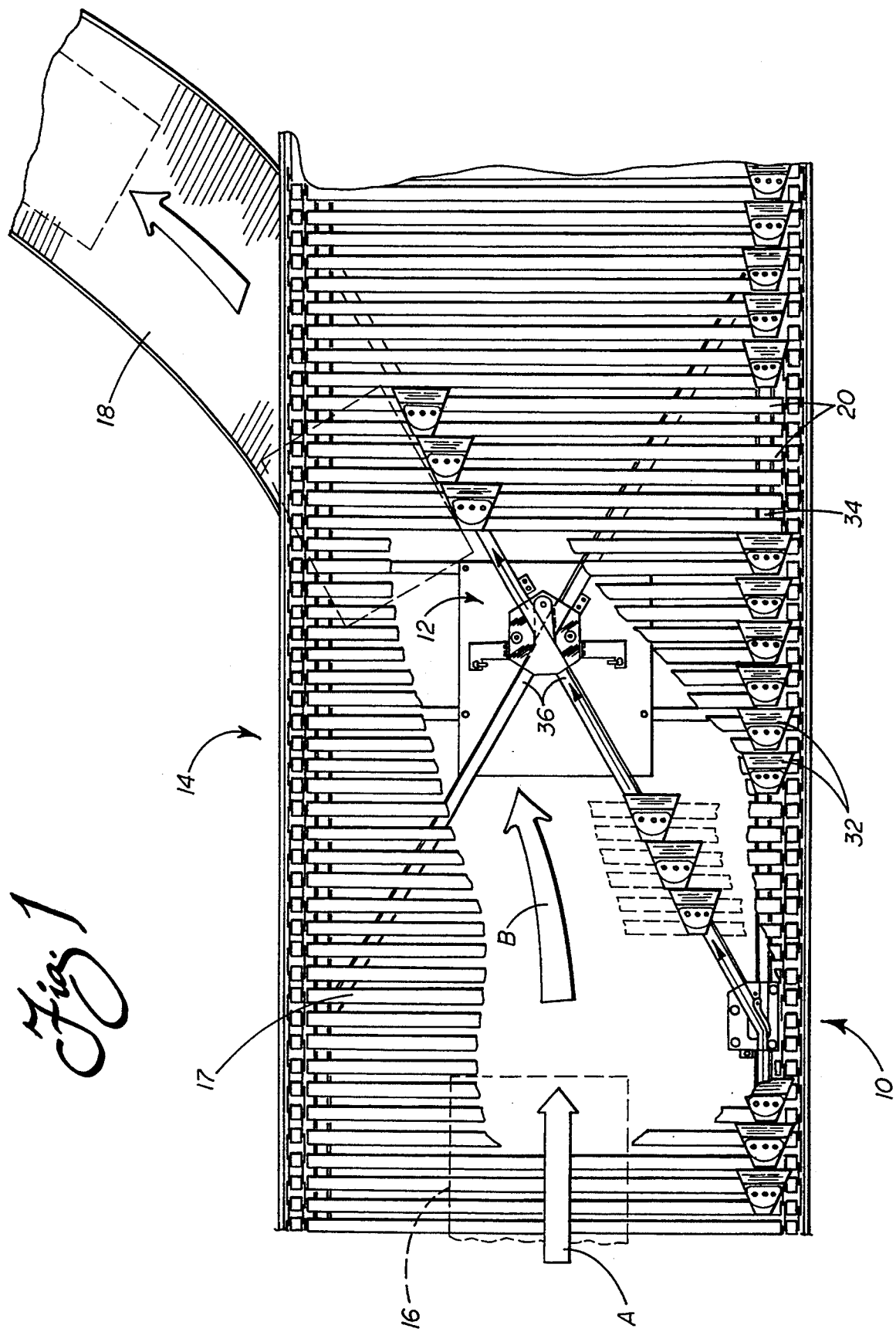
FIG. 1 is a plan view of the slat sorter with the transport surface partially broken away to illustrate the positions of the divert switch and crossover switch.

The slat sorter 14 is designed to selectively divert articles 16 from forward travel along a main line conveyor 17 and transfer them to a takeaway conveyor 18 positioned at a desired location along one side of the main line conveyor. It can be appreciated that any number of takeaway conveyors 18 may be utilized in cooperation with the main line conveyor 17 and positioned at strategic locations longitudinally along and on either side of the main line conveyor. FIG. 1 depicts a right hand divert switch 10 designed to divert articles 16 to a takeaway conveyor 18 positioned on the left side of the main line conveyor 17 as viewed in the direction of forward travel. It can be visualized that a left hand divert switch 10 may be positioned on the left side of the main line conveyor 17 to direct articles 16 to a takeaway conveyor 18 abutting the right side of the main line conveyor. Left hand and right hand divert switches are mirror images of each other and the references to components of the divert switch 10 apply to each design.

Figure 9:
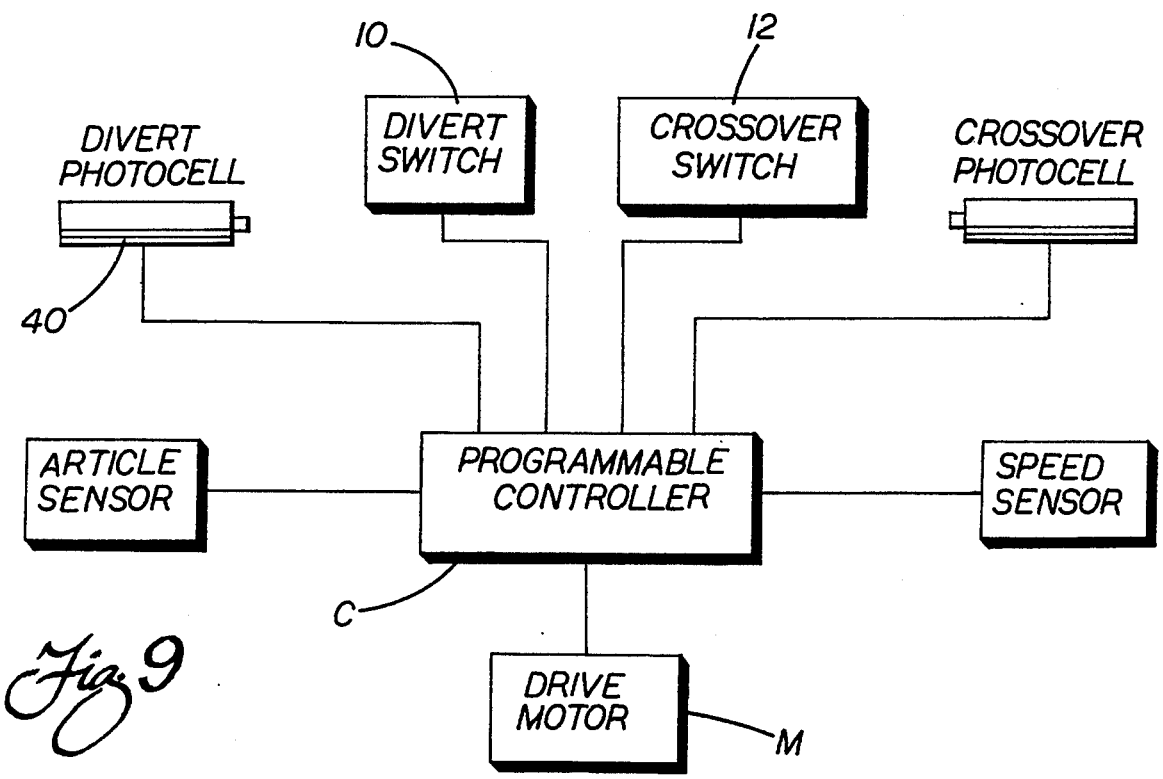
FIG. 9 is a schematic view of the control circuit associated with the inventive slat sorter.

The transport surface is defined by a plurality of transverse tubes or slats 20 that extend between sides 21 of the conveyor frame. The transport surface is driven by a sprocket/chain assembly cooperating with a prime mover such as a motor. The motor and sprocket combination M contemplated for use with the slat sorter 14 is of common design and thus is only illustrated schematically in FIG. 9.

Figure 2:
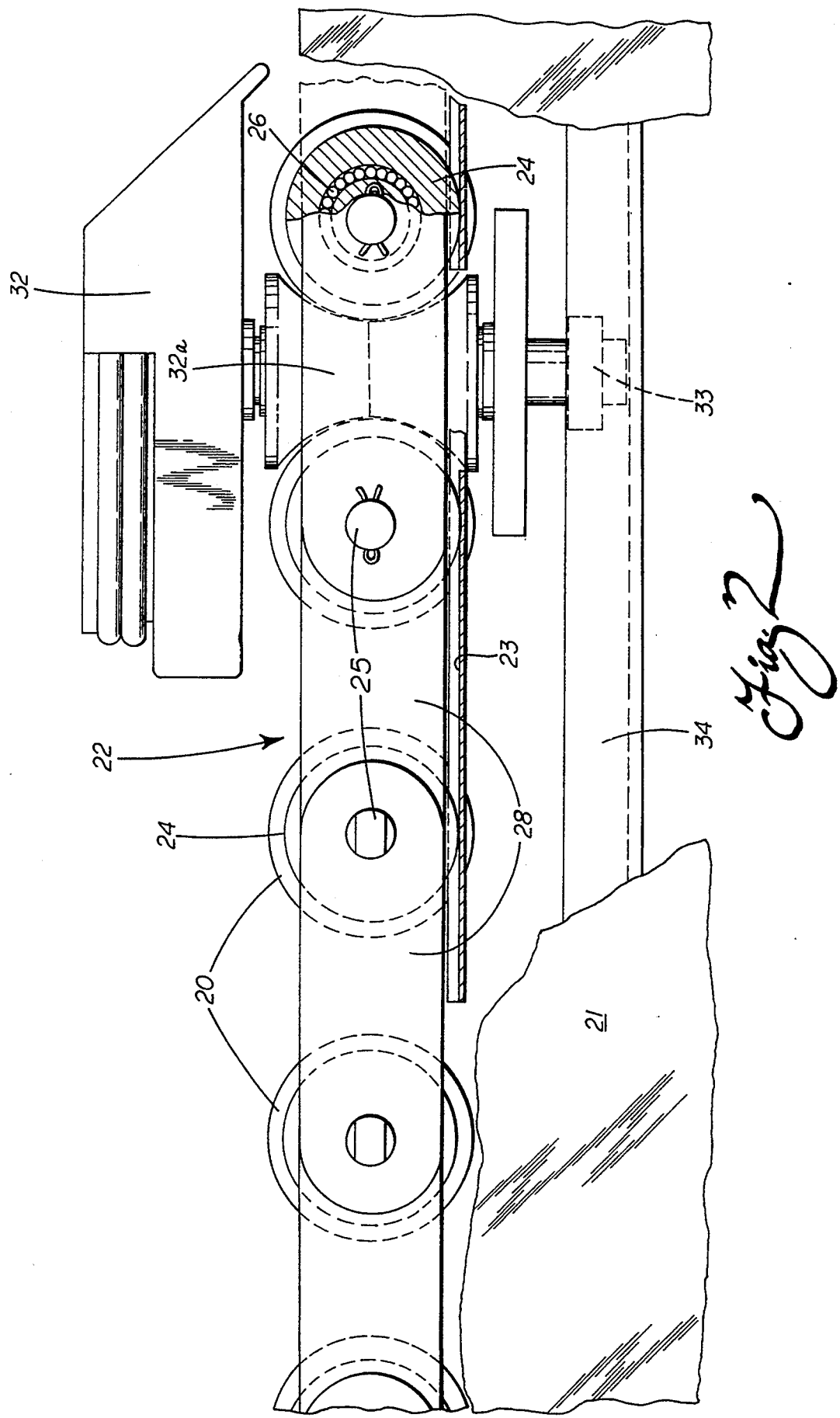
FIG. 2 is a side view of the slat sorter with a portion of the side frame broken away, showing the divert shoe supported on the transverse rollers of the transport surface and its depending guide member, and further illustrating the bearing chain utilized in driving the main line conveyor.

An important aspect of the slat sorter 14 is the use of a bearing chain 22 riding in side tracks 23, one being shown in FIG. 2, for cooperation with the driving sprocket. The preferred embodiment of the invention contemplates the use of a precision bearing chain 22. The precision bearing chain is a standard commercial item and can be purchased from vendors such as Acme Chain, Inc. of Holyoke, Mass. The precision bearing chain 22 is comprised of a plurality of bearing rollers 24 having internal needle bearings 26. The bearing rollers are connected by connector links 28 to form the chain 22. The bearing rollers 24 have non-rotating stub shafts 25 fixed to the links 28 that cooperate to support the slats 20. Accordingly, it can be appreciated that as the prime mover drives the precision bearing chain 22 through the sprocket, the slats 20 forming the transport surface are propelled for forward travel.

The use of the precision bearing chain 22 reduces the friction associated with main line conveyor motion and thus the power requirements. Accordingly, the chain 22 further enhances the efficiency of the slat sorter 14.

In general operation, articles 16 travel along the main line conveyor 17 in the direction of arrow A from a processing station or stations upstream. A plurality of pusher elements or divert shoes 32 are mounted for movement with the slats 20 in the direction of forward travel A in a straight-through mode defining continued article conveyance for downstream handling. In this mode, the shoes 32 are guided along either of opposing sides of the main line conveyor 17. The destination of the article is predetermined and programmed into programmable controller C (see FIG. 9 and description below) associated with the slat sorter 14.

When the article 16 is approaching the takeaway conveyor 18 that carries it to its ultimate destination, the controller C initiates the divert mode. It can be appreciated from FIG. 9 that the controller monitors article size and position and slat sorter speed and coordinates this information with the location of the desired takeaway conveyor 18. The controller assigns a set of divert shoes 32 to the article and directs the appropriate divert switch 10 to intercept this specific set of shoes at the proper time.

The leading divert shoe 32 of the set approaching the divert switch 10 is sensed and a signal is transmitted for diversion of the assigned shoes. As shown, the set of divert shoes 32, each shoe being mounted on a pair of concave rollers 32a (see FIG. 2), slides transversely across the slat sorter 14 in a diagonal direction in response to a divert signal; thus engaging and directing each article 16 in accordance with the flow arrow B in FIG. 1 to the desired takeaway conveyor 18.

When the shoes 32 thus diverted reach the opposite side of the main line conveyor 17, they continue along that side during forward travel of the transport surface. They are thus in position to divert articles 16 in the opposite direction following a return run to the entry point of the main line conveyor 17. Alternatively, the divert shoes 32 may be returned to the original side of the main line conveyor 17 during the return run to prepare for repeat divert operation.

Each divert shoe 32 includes a guide member that depends from the shoe body. In the preferred embodiment, the guide member is a roller 33. In the straight-through mode, the roller 33 engages and is guided by straight-through guide track 34 (see FIG. 1). Likewise, the roller 33 engages and is directed along the diagonal guide track 36 when in the divert mode. It can be visualized that the engagement between the roller 33 and the appropriate guide track 34, 36 provides positive directional control for the divert shoe 32.

Figure 3:
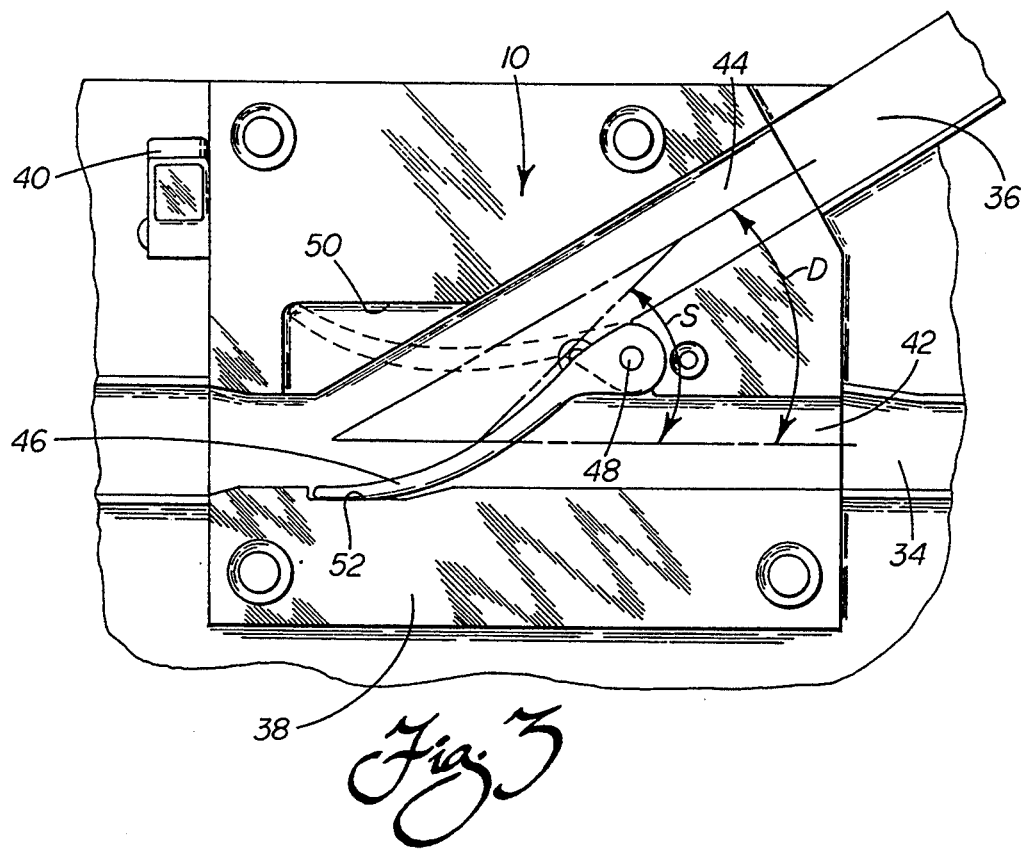
FIG. 3 is an enlarged plan view of the divert switch of the present invention, showing the divert position in full line and the home position in phantom line.
Figure 4:
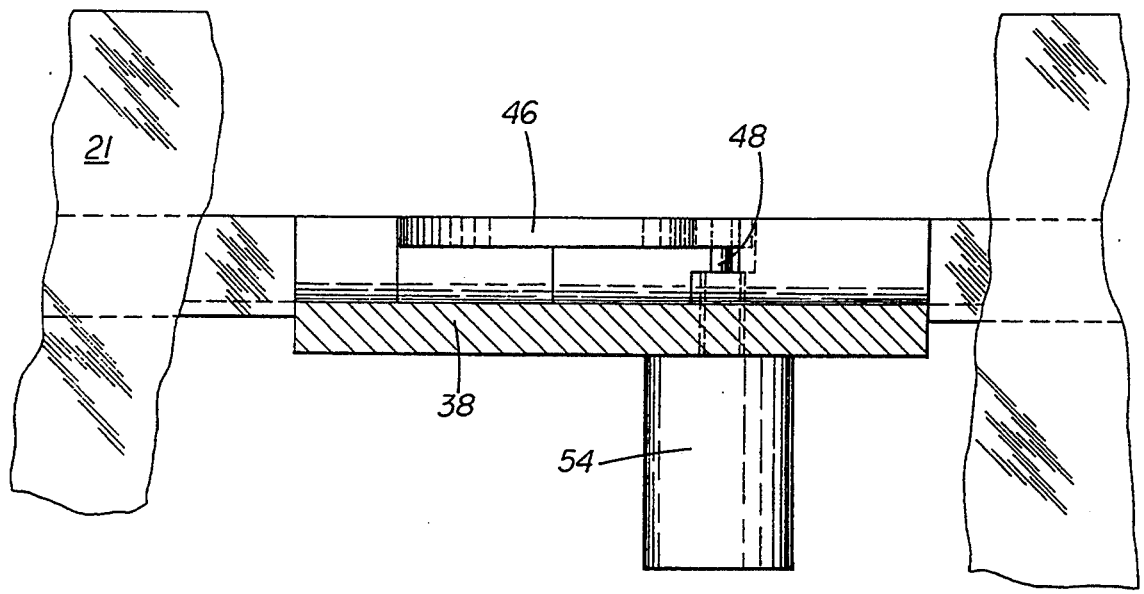
FIG. 4 is a side view of the divert switch of the present invention, showing the brushless torque actuator in position beneath the base of the divert switch.

As shown in FIGS. 3 and 4, the inventive divert switch 10 comprises a base 38 that is mountable to the frame of the main line conveyor 17. In the preferred embodiment, an optical sensor in the form of a photocell 40 is attached to the base 38 immediately upstream from the divert location. The divert photocell 40 senses the divert shoes 32 passing by and transmits signals to the controller which calls for divert operation at the appropriate time.

The base 38 is formed with a straight-through channel 42 that is aligned with the straight-through guide track 34. The base 38 also includes a divert channel 44 that is oriented at an oblique angle relative to the straight-through channel 42 and aligns with the diagonal guide track 36.

The divert switch 10 includes a switch arm 46 that is manipulated to intercept and divert the guide roller 33 of the divert shoe 32 when the divert mode is initiated. As shown in FIG. 3, the switch arm 46 is mounted on a pivot pin 48 that allows the switch arm to pivot between a home position shown in phantom line and a divert position shown in full line. It can be appreciated that when the switch arm 46 is in the home position, the divert shoes 32 proceed along the straight-through channel 42 in a forward direction with the transport surface. Alternatively, when the switch arm 46 is in the divert position, the arm engages the roller 33 of the divert shoe 32, altering its course and directing it into the divert channel 44 to proceed with divert mode operation.

The base 38 is also formed with a home recess 50 and a divert recess 52 to allow the switch arm 46 to properly cooperate with the guide roller 33 of each divert shoe 32 traveling in both the straight-through and divert modes.

In an important aspect of the invention, the divert switch 10 includes means defined by rotary driving operation, but operative without linear-to-rotary motion conversion, to positively and selectively actuate the pivoting movement of the switch arm 46 in both directions; i.e. from home position to divert position and from divert position to home position. A brushless torque actuator 54 is the preferred actuator and directly cooperates with the pivot pin 48 to positively drive the switch arm 46 into both the divert and home positions.

Figures 5A, 5B:
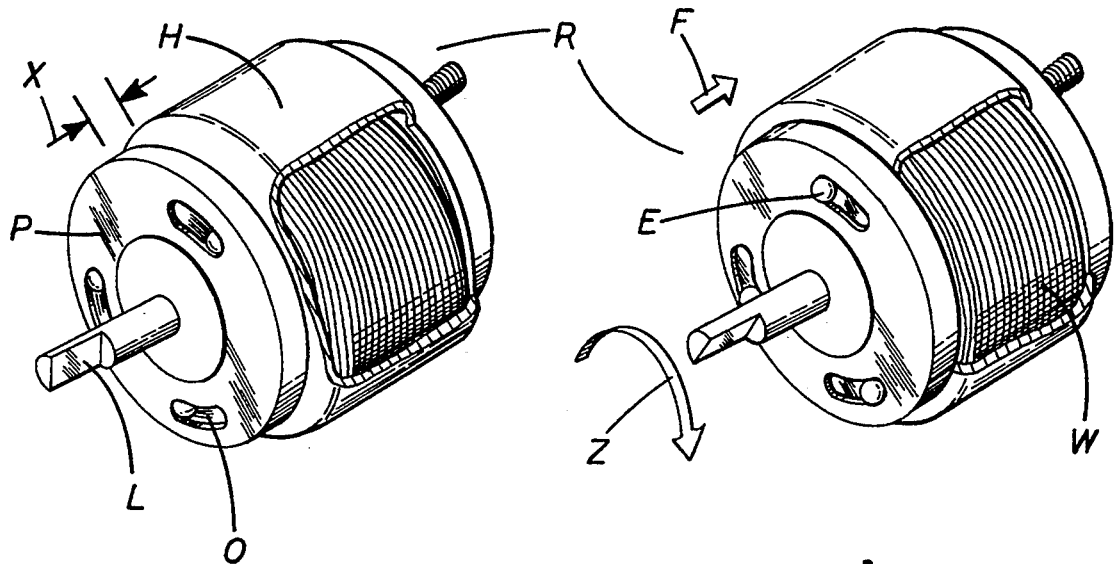
FIG. 5a is a partial cutaway perspective view showing a conventional prior art rotary solenoid in its deenergized state.
FIG. 5b is a partial cutaway perspective view showing the linear-to-rotary motion conversion of a prior art rotary solenoid following energization.
Figures 6A, 6B:
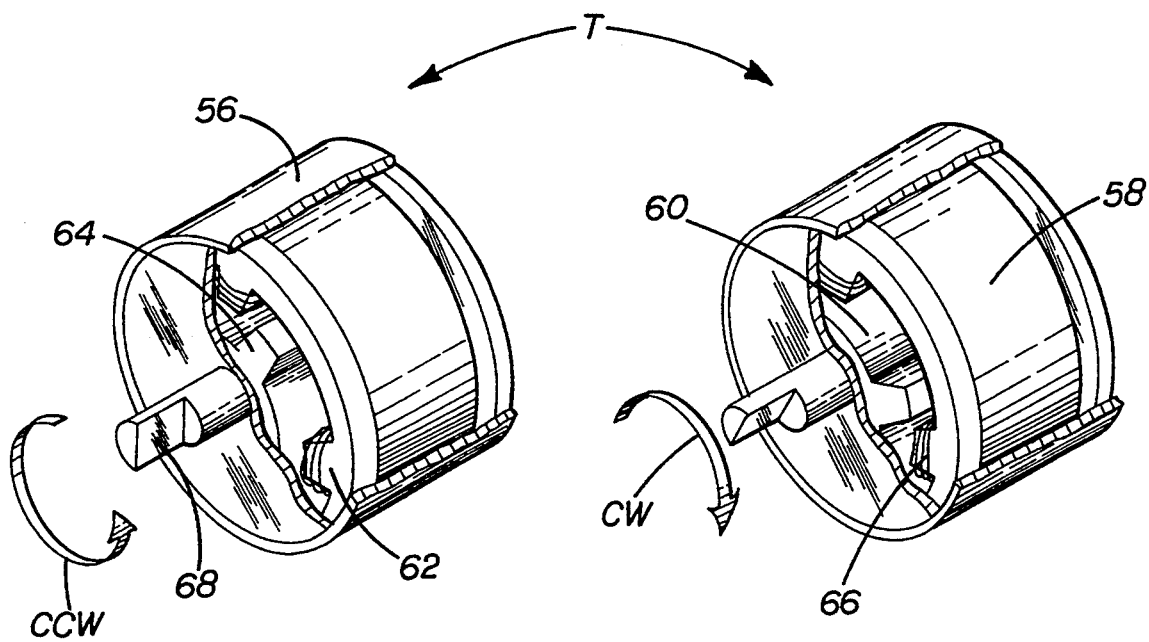
FIG. 6a is a partial cutaway perspective view showing the operation of a brushless torque actuator of the present invention following energization to pulse in the counterclockwise direction.
FIG. 6b is a partial cutaway perspective view showing the operation of a brushless torque actuator of the present invention following energization to pulse in the clockwise direction.
Figure 6C:
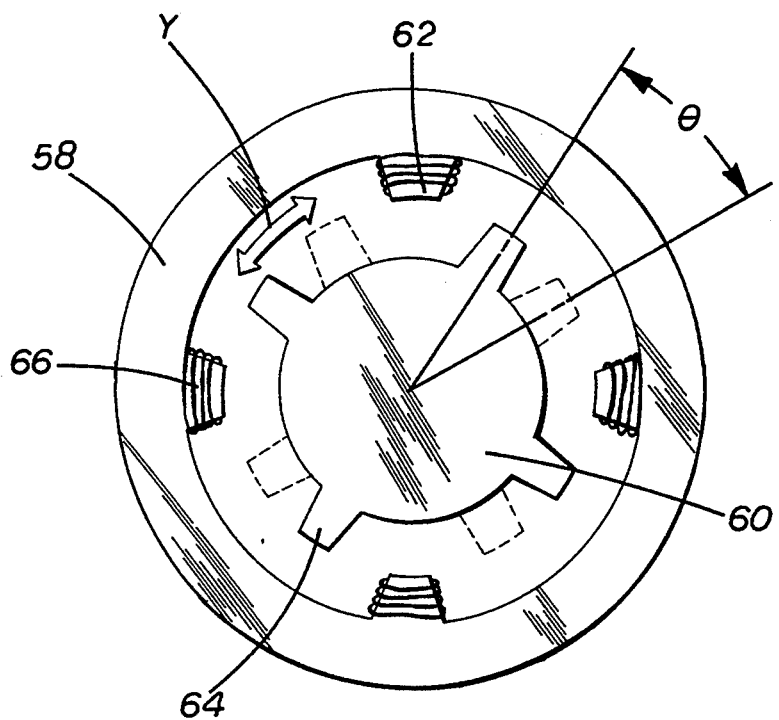
FIG. 6c is a cross-sectional view of the brushless torque actuator of the present invention showing the position of the rotor poles as pulsed in the counterclockwise direction in full line and the position of the rotor poles as pulsed in the clockwise direction in phantom line.

FIGS. 6a–6c particularly illustrate the operation of the brushless torque actuator, therein generally referred to as T. The brushless torque actuator T functions in a manner contrasting to that of prior art rotary solenoids, a conventional design of which is generally referred to as R in FIGS. 5a and 5b. More particularly, the use of a rotary solenoid R to drive a load requires linear-to-rotary motion conversion. As will become apparent from a comparison of the rotary solenoid R and the brushless torque actuator T as described below, the brushless torque actuator provides significant advantages by eliminating the requirement to convert linear motion to rotary motion for proper operation.

With reference to FIGS. 5a and 5b, the housing H of the rotary solenoid R encases a coil winding W. The coil winding W surrounds an armature shaft (not shown), at one end of which is attached an armature plate P. The plate P is juxtaposed to the load end of the housing H and has three slots O that are formed with an inclined surface. The slots O define raceways for stainless steel balls E that are attached to the outer surface of the load end of housing H.

The rotary solenoid R generates rotary motion in the following manner. When the coil W is energized, a linear electromagnetic force pulls the armature shaft into its core area. The axial displacement of the shaft is transmitted to the armature plate P as indicated by action arrow F in FIG. 5b. The distance which the armature plate P travels from its de-energized position spaced from the housing to its energized position against the housing is defined by the length X in FIG. 5a. Simultaneously with this linear motion, the balls E travel around and down to the deep end of the inclined raceway slots O. This transmits a rotary motion to the load shaft L attached to the armature plate P as indicated by action arrow Z in FIG. 5b. Accordingly, it can be appreciated that the load, i.e. a switch arm, attached to the load shaft L of a rotary solenoid R is driven to rotate by linear-to-rotary motion conversion.

With reference now to FIGS. 6a–6c, it is seen that the brushless torque actuator T comprises a housing 56 that encases a stator 58 and a rotor 60. The stator 58 and rotor 60 each have a corresponding number of poles 62, 64, respectively. The preferred embodiment depicted in the drawing figures presents four each of the stator poles 62 and rotor poles 64. However, a fewer or greater number of corresponding pole sets may be used.

In an important aspect of the actuator T, a single-phase coil 66 is wound around each of the stator poles 62. When the single-phase coil 66 is energized, an electromagnetic flux is created, urging the rotor poles 64 to rotate toward alignment with the stator poles 62 along the flux path. Complete alignment between corresponding stator poles 62 and rotor poles 64 occurs in the absence of any internal or external stop mechanisms. However, in many applications, including that of the present invention as more fully described below, stop mechanisms are used to prevent full rotary actuator stroke. This is beneficial in increasing the service life of the brushless torque actuator T and exemplifies the design flexibility associated therewith over a wide range of stroke angles and torque requirements.

The incorporation of a single phase coil in the brushless torque actuator T also distinguishes its performance from torque motors that operate by switching between sets of different phased coils. The switching operation in torque motors generates continuous full rotor rotation by driving rotor poles into alignment in successive fashion with stator poles around the entire circumference of the stator. Since brushless torque actuators T do not require the switching function, switching mechanisms such as brush/commutator assemblies are not incorporated as components therein.

The use of a single phase coil allows the brushless torque actuator T to generate torque over a limited angle of rotation. More particularly, since a single phase coil 66 is wound around each of the stator poles 62, the flux path associated with each stator pole is contemporaneously identical and remains constant throughout the entire state of energization. Thus, absent any stop mechanisms, once each rotor pole 64 rotates into alignment with the closest adjacent stator pole 62 following energization, they all remain in that configuration without further rotational movement. With the four-pole embodiment shown and the capability of changing the polarity of the current through the coil 66, it can be visualized that the brushless torque actuator T has a range of allowable motion of 90° for full actuator stroke.

By changing the polarity of the coil 66, the rotor 60 of the brushless torque actuator T is capable of pulsing in both the clockwise and counterclockwise directions (see action arrow Y in FIG. 6c). In this manner, the load driven by the actuator T is capable of being positively and controllably moved in both the clockwise and counterclockwise directions (compare action arrows CCW and CW in FIGS. 6a and 6b, respectively). As will be explained below, the brushless torque actuator T as used in the present invention rotates through an angle of less than 90° due to external stop mechanisms. In any event, sufficient torque is generated to move a load with pure rotary driving action through a limited angle of rotation.

Summarizing briefly the advantages of the brushless torque actuator T, its operation obviates the linear-to-rotary motion conversion of prior art rotary solenoids R. This results in space saving benefits by avoiding accommodation for external motion such as the linear movement of the solenoid armature plate P. Furthermore, the service life of the actuator T is significantly improved over the solenoid R since the actuator eliminates the need to account for the load on the bearing surfaces between the slots O and the balls E of the solenoid R. Finally, the brushless torque actuator T does not include switching mechanisms common to torque motors, resulting in longer service life and simpler design as compared with that category of rotary movers.

FIGS. 3 and 6c collectively illustrate how the torque actuator T operates to drive the inventive switch arm 46. It can be appreciated that the load shaft 68 depicted in FIGS. 6a and 6b cooperates with the pivot pin 48 illustrated in FIG. 3. As shown, the switch arm 46 travels in a range of motion of less than 90°. The recess walls of the home recess 50 and the divert recess 52 act as stops to limit to actuator stroke. Thus, when the coil 66 of the brushless torque actuator T is energized to pulse in the counterclockwise direction, the switch arm 46 is positively driven from the home position to the divert position in response to the rotor 60 being rotated from the phantom line position to the full line position in FIG. 6c. The engagement between the switch arm 46 and the wall of the divert recess 52 acts to prevent the rotor poles 64 that are being urged toward the closest adjacent stator poles 62 from coming into complete alignment therewith.

When the polarity of the coil 66 is reversed, the pulsation of the actuator T is in the clockwise direction. The switch arm 46 is then positively driven from the divert position to the home position. This movement is in response to rotation of the rotor 60 between the full line position of FIG. 6c to the phantom line position. It can again be appreciated that engagement between the switch arm 46 and the wall of the home recess 50 limits the movement of the rotor poles 64 so that complete alignment between them and the closest adjacent stator poles 62 in the clockwise direction is not achieved. Accordingly, the range of motion of the rotor 60 of the brushless torque actuator T is defined by the angle $\ominus$. It can be appreciated that a wide range of operational strokes may be accommodated depending on the application requirements.

While the constant energization of the coil 66 in either polarity mode keeps the rotor 60 and thus the switch arm 46 in the desired position, alternatively, a dual position, over-center spring (not shown) may be provided with the switch arm 46/brushless torque actuator 54 assembly to function for this purpose. In other words, the spring biases the arm with a minimum holding force only after passing over the center of movement in either direction.

The brushless torque actuator T is provided by an outside vendor according to the particular parameter requirements for the desired operation of the inventive slat sorter. The design considerations include the length of switch arm travel, the rotational mass moment of inertia of the switch arm and the required switching time. The brushless torque actuator T of the preferred embodiment may be purchased from Lucas Ledex, Inc. of Vandalia, Ohio.

With reference now back to FIGS. 3 and 4, the brushless torque actuator 54 generates faster switching motion than other types of prior art actuators for the switch arm 46 and therefore allows the slat sorter 14 to operate at higher speeds. More particularly, the switching time measured for the rotary 20 actuator of the preferred embodiment is approximately 8 to 8½ milliseconds as compared with 30 milliseconds for commonly used pneumatic devices. This allows the slat sorter 14 incorporating the novel divert switch 10 in combination with the programmable controller C to operate at an upper limit running speed approximately 15% –20% higher than possible with prior art sorting conveyor assemblies.

The switch arm 46 is preferably fabricated from a high strength, lightweight plastic, such as ABS plastic, to decrease its moment of inertia. Since the brushless torque actuator 54 drives the switch arm positively in both directions, the incorporation of a return spring that forces the switch arm 46 back to the home position is obviated.

In an additional important aspect of the inventive divert switch 10, the switch arm 46 is provided with an arcuate contour or curvature. This aids in the smooth engagement between the switch arm 46 and the roller 33 of the divert shoe, providing even transition from straight-through mode to divert mode.

Furthermore, when in the divert position, the guide surface of the switch arm 46 curves to a point adjacent the exit with the roller 33 of the divert shoe 32 where a tangent extending therefrom defines an angle relative to forward travel that is greater than the divert angle (see FIG. 3). More particularly, the common divert angles are 30° up to speeds of about 400 ft/min and 20° for higher speeds. FIG. 3 illustrates a 30° divert angle D. The preferred embodiment of the switch arm 46 defines a maximum angle S of the guide surface to be 45° relative to forward travel. This configuration allows the divert shoe 32 to pass through the divert switch 10 in a smoother fashion, thus facilitating a shorter transient time through the switch, and a higher speed operation. Simply stated, the particular configuration of the switch arm 46 relative to the overall switch design optimizes the time/space relationship for effective switch operation.

An additional benefit of the increased switching time relates to the positioning of the photocell 40. More specifically, in prior art designs, as conveyor speed approaches the upper allowable limit, the sensor requires slight positional adjustments in order to effectuate proper timing for switch actuation. The photocell 40 used in combination with the inventive divert switch 10 does not require such adjustment. It is positioned along the main line conveyor 17 at the desired upstream position and operates effectively at that position for all operational speeds.

Referring again to FIG. 1, the slat sorter 14 is shown with a crossing track network so that it may be adapted to divert articles 16 towards both sides of the main line conveyor 17 at substantially the same longitudinal position. The crossing network includes the diagonal guide tracks 36 on which the divert shoes 32 are guided when in the divert mode. With such a design, a crossover switch 12 is presented at the crossing point of the network. The crossover switch 12 is mounted to the chassis of the slat sorter 14 beneath the transport surface as shown in FIG. 1.

The crossover switch 12 is presented in more detail in FIGS. 7 and 8. The switch 12 includes a base 70 that is attached to the slat sorter chassis. The leading end of the base 70 has an entry opening 72 to allow unobstructed entry for the rollers 33 into the crossover switch 12. This minimizes the opportunity for jamming in case a roller 33 entering the switch base 70 from the upstream section of the guide tracks 36 is in an off-line position.

The trailing end of the base 70 includes diverging channels 74L, 74R that are aligned with the downstream sections of the diagonal guide tracks 36. The entry opening 72 narrows to a point where the path of the diagonal guide tracks 36 intersect and the diverging channels 74L, 74R begin. The diverging channels 74L, 74R in conjunction with a gate 76 cooperate with the guide tracks 36 to ensure that the guide shoes 32 are properly directed in their diagonal path across the slat sorter 14 as they go through and past the crossover switch 12.

The gate 76 is mounted to the trailing end of the base 70 for pivoting action about an axis defined by a mounting shaft 78. The gate 76 rotates between two limit positions as shown in full line and phantom line in FIG. 7. Each limit position defines a configuration whereby one of the channels 74L, 74R is blocked to prevent travel therethrough and the other of the channels is open to allow unobstructed passage.

Thus, with specific reference to FIG. 7, when the right-hand divert switch 10 operates in the divert mode to direct divert shoes diagonally across the slat sorter 14 in the manner shown in FIG. 1, the gate 76 is driven to the full line position as will be more fully explained below to accommodate unobstructed travel in the direction of action arrow G. In this configuration, the gate 76 forms a bridge across channel 74R to create a substantially continuous wall against which the rollers 33 of the divert shoes 32 travel in rolling engagement to facilitate passage through the crossover switch 12 between upstream and downstream sections of the diagonal guide track 36 leading to the left-hand side of the slat sorter 14 in the direction of forward travel.

As best shown in FIG. 7, the gate 76 takes the form of a flipper. The mounting shaft 78 is attached to a proximal end 80 of the gate 76 to define the latter's pivot axis. The gate 76 tapers to an apex at its distal end, each interchangeably referred to as numeral 82. At each of the limit positions of the gate 76, the apex 82 rests against a seat 84, each seat being on opposing sides of the intersection of the diagonal paths through the crossover switch 12. The seats 84 are preferably configured to allow the tapered apex 82 to complete the substantially continuous wall against which the rollers 33 of the divert shoes 32 ride as they pass through the crossover switch 12.

The gate 76 is positively driven to both positions shown in FIG. 7. In the preferred embodiment of the invention, this is accomplished by the same type of rotary actuator as is used to drive the switch arm 46 of the divert switch 10. More specifically, a brushless torque actuator 86 (see FIG. 8) provides the driving motion to rotate the gate 76 between the limit positions. The brushless torque actuator 86 is designed to function in the same manner as the embodiment described in FIGS. 6a–6c. Accordingly, the operation and resulting advantages described above apply equally as well with the use of the actuator 86 as a component of the crossover switch 12 and need not be repeated here.

In the preferred embodiment of the crossover switch 12, the gate 76 has a range of motion of substantially 30° (corresponding to angle ⊖ in FIG. 7). It can be appreciated that the load shaft 68 depicted in FIGS. 6a and 6b for the brushless torque actuator T therein cooperates with the mounting shaft 78 on which the actuator 86 shown in FIGS. 7 and 8 is mounted. Furthermore, the seats 84 in the base 70 of the switch 12 also serve as mechanical stops to prevent the rotor poles 64 from rotating through the full actuator stroke. Thus, the stroke is limited to the desired angle ⊖ as described above for a four-pole embodiment of the brushless torque actuator T.

The gate 76 is actuated in response to the sensed presence of a divert shoe 32 approaching the crossover switch 12 from the upstream direction. A sensor in the preferable form of a fiber optic photocell 88 is positioned in advance of the leading end of the switch base 70, to which it is attached by mounting brackets 90. The photocell 88 is operatively associated with the controller C (see FIG. 9). Accordingly, when the photocell 88 senses the presence of a passing roller 33 of the approaching divert shoe 32, it sends a signal to the controller C. The controller C then sends a signal to energize the coil of the brushless torque actuator 86 with the proper polarity, which then operates to drive or maintain the gate 76 in the appropriate position.

The gate 76 is preferably fabricated from a high strength, lightweight plastic. The use of such material enhances the operational characteristics of the gate 76 and provides durability for a long service life. This is of particular importance in view of the switching contact between the gate 76 and the seats 84 of the crossover switch base 70.

In summary, numerous benefits result from employing the concepts of the present invention. The brushless torque actuator 54, 86 incorporated as part of both the divert switch 10 and the crossover switch 12, respectively, generates positive actuating motion to pivot the switch arm 46 and the gate 76 of the respective switches to both of their limit positions. This generates quicker switching time than with previous switch designs employing pneumatic switches with mechanical linkages. The slat sorter 14 incorporating the divert switch 10 and the crossover switch 12 is capable of operating at higher speeds. Additionally, the faster switching time obviates the need to adjust the position of the respective photocells 40, 88 at speeds approaching the upper limit.

The use of the brushless torque actuator 54, 86 to generate the rotary motion to drive the switch arm 46 of the divert switch 10 and the gate 76 of the crossover switch 12 not only enhances the operational speed of the system but also provides advantages in space reduction. By eliminating the need to convert linear motion to rotary motion as with prior art rotary solenoids, the brushless torque actuator 54, 88 of the inventive switches can be accommodated in a smaller area. The brushless torque actuator 54, 88 also has fewer mechanical components reducing the opportunity for operational wear and thus is capable of longer service life.

It can be appreciated that the use of both the divert switch 10 and the crossover switch 12 with their simplified designs provide significant cost reduction for the overall conveyor system while permitting higher speed operation and dependable efficiency.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as is suited to the particular use contemplated. All such modifications and variations are within the scope of the invention as determined by the appended claims when interpreted in accordance with the breadth to which they are fairly, legally and equitably entitled.

I claim:

1. A divert switch for a sorting conveyor system having pusher elements that selectively engage and direct articles from a main conveyor to a lateral takeaway conveyor, comprising:

a base for attachment to the main conveyor;

a switch arm connected to said base and movable between a home position for straight-through travel of said pusher elements and a divert position for directing said pusher elements to engage and direct said articles to said takeaway conveyor; and means defined by rotary driving operation, but operative without linear-to-rotary motion conversion, for selectively actuating the movement of said switch arm to both said home and divert positions, said selective actuating means comprising a rotary actuator energizable through a single-phase coil to generate limited rotary motion.

2. The divert switch of claim 1, wherein said actuator comprises a brushless torque actuator.

3. A crossover switch for a sorting conveyor system having a crossing guide network for guiding pusher elements that selectively engage and direct articles from a main conveyor to a takeaway conveyor positioned on either side of said main conveyor, comprising:

a base for attachment to said main conveyor;

a plurality of channels in said base for receiving guide members on said pusher elements;

a gate movable between limit positions, each of said limit positions blocking one of said channels to prevent travel therethrough and opening another of said channels to facilitate unobstructed passage therethrough; and means defined by rotary driving operation, but operative without linear-to-rotary motion conversion, for selectively actuating the movement of said gate to said limit positions, said selective actuating means comprising a rotary actuator energizable through a single-phase coil to generate limited rotary motion.

4. The crossover switch of claim 3, wherein said actuator comprises a brushless torque actuator.

5. The crossover switch of claim 3, further comprising a sensor attached to said conveyor frame upstream from said gate cooperable with a programmable controller to control the actuation of said gate between said limit positions.

6. The crossover switch of claim 3, wherein said gate is formed with a proximal end which defines a pivot axis for rotational movement and tapers to an apex at a distal end.

7. The crossover switch of claim 6, wherein said base includes a seat on each of opposing sides of the intersection of said crossing guide network through said base against which said gate apex rests when actuated to each of said limit positions.

8. A sorting conveyor system for selectively diverting articles from a main conveyor to a lateral takeaway conveyor, comprising:

a frame defining said main conveyor;

a transport surface for supporting said articles and mounted for relative movement on said frame;

means for driving said transport surface in a forward direction;

pusher elements mounted on said transport surface for travel selectively along with said transport surface in a forward direction or diagonally across said transport surface so as to engage and direct articles to said takeway conveyor;

means for guiding said pusher elements along both the forward direction and the diagonal direction;

means for diverting said pusher elements from the forward direction to the diagonal direction; and means defined by rotary driving operation, but operative without linear-to-rotary motion conversion, for selectively actuating the diverting means for movement between a home position to allow said pusher elements to travel along with said transport surface in a forward direction and a divert position to direct said pusher elements for diagonal travel across said transport surface, said selective actuating means comprising a rotary actuator energizable through a single-phase coil to generate limited rotary motion.

9. The sorting conveyor system of claim 8, wherein said rotary actuator comprises a brushless torque actuator.

10. The sorting conveyor system of claim 8, wherein is further provided a crossover switch having a crossing guide network for guiding the pusher elements for selectively engaging and directing the articles from the main conveyor to the takeaway conveyor, including a base for attachment to said main conveyor;

a plurality of channels in said base for receiving guide members on said pusher elements;

a gate movable between limit positions, each of said limit positions blocking one of said channels to prevent travel therethrough and opening another of said channels to facilitate unobstructed passage therethrough; and means defined by rotary driving operation, but operative without linear-to-rotary motion conversion, for selectively actuating the movement of said gate to said limit positions.

11. The sorting conveyor system of claim 10, wherein said selective actuating means for said crossover switch comprises a rotary actuator energizable through a single-phase coil to generate limited rotary motion.

12. The sorting conveyor system of claim 11, wherein said rotary actuator for said crossover switch comprises a brushless torque actuator.

13. The sorting conveyor system of claim 10, further comprising a sensor attached to said conveyor frame upstream from said gate cooperable with a programmable controller to control the actuation of said gate between said limit positions.

14. The sorting conveyor system of claim 10, wherein said gate is formed with a proximal end which defines a pivot axis for rotational movement and tapers to an apex at a distal end.

15. The sorting conveyor system of claim 14, wherein said base includes a seat on each of opposing sides of the intersection of said crossing guide network through said base against which said gate apex rests when actuated to each of said limit positions.

* * * * *